June 24, 1941.   D. H. BAILEY   2,247,143
DIALYSIS METHOD AND APPARATUS
Filed July 13, 1938    5 Sheets-Sheet 5
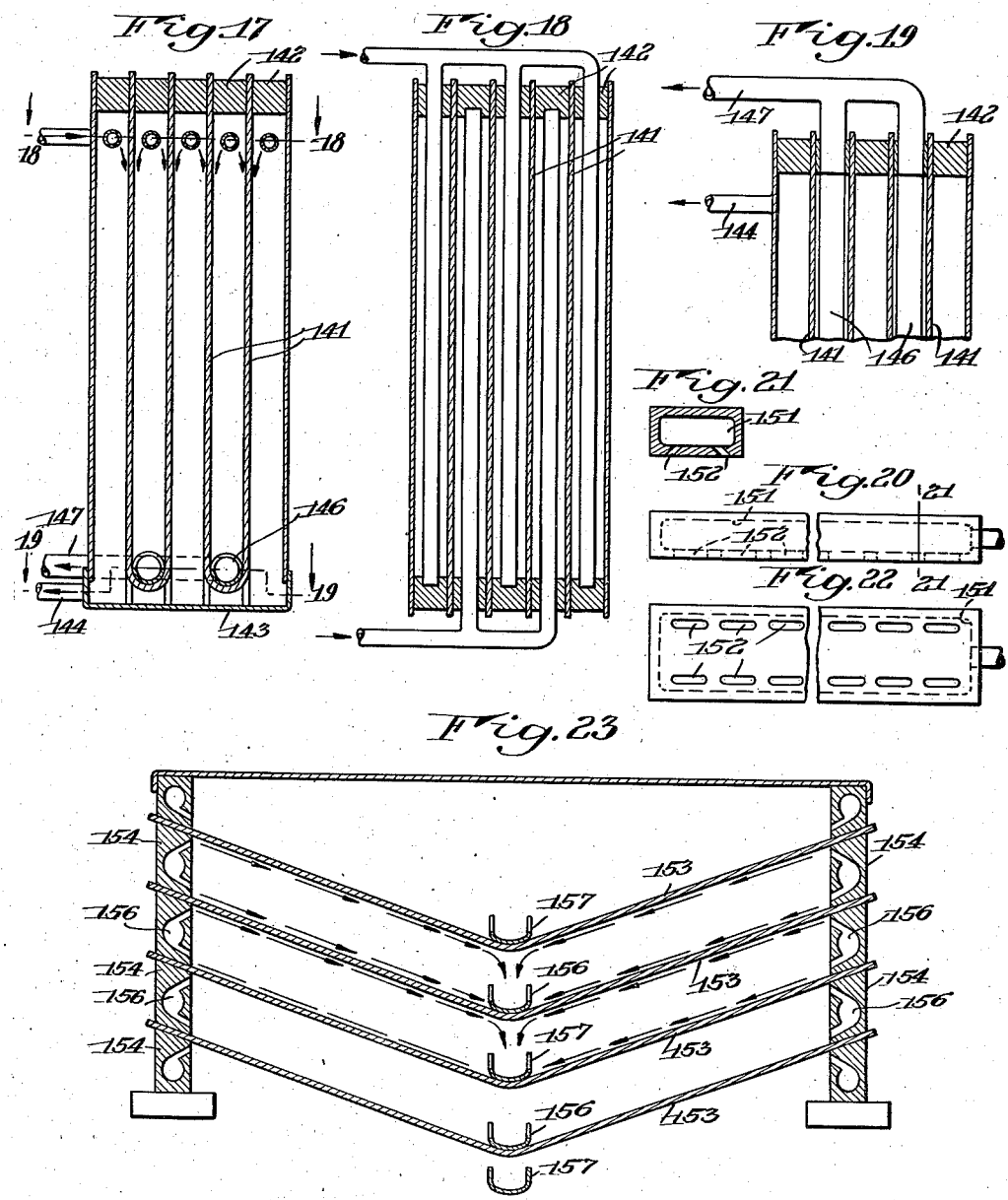
INVENTOR.
Dana H. Bailey
BY Cumpston & Shepard
his ATTORNEYS Patented June 24, 1941

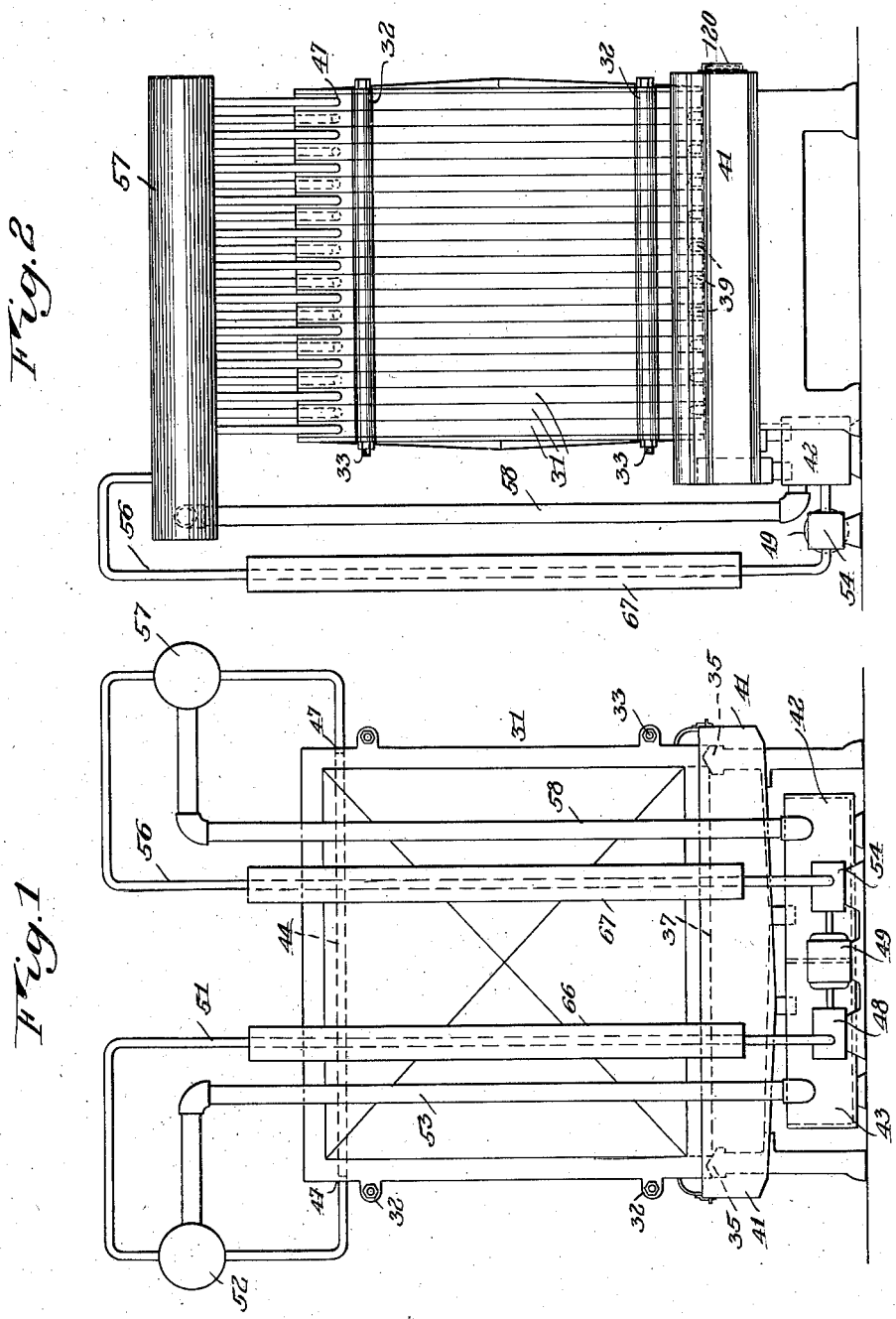

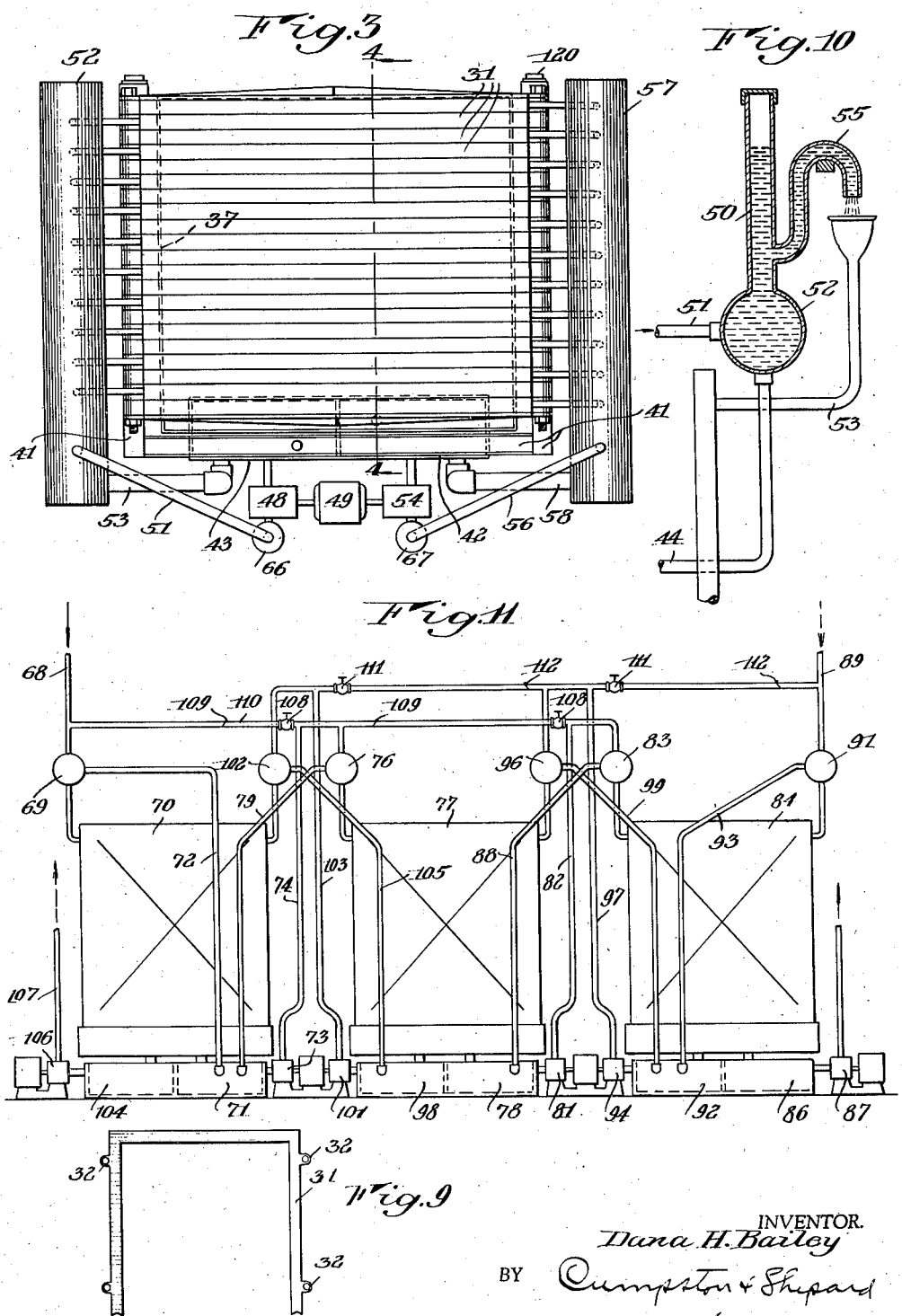

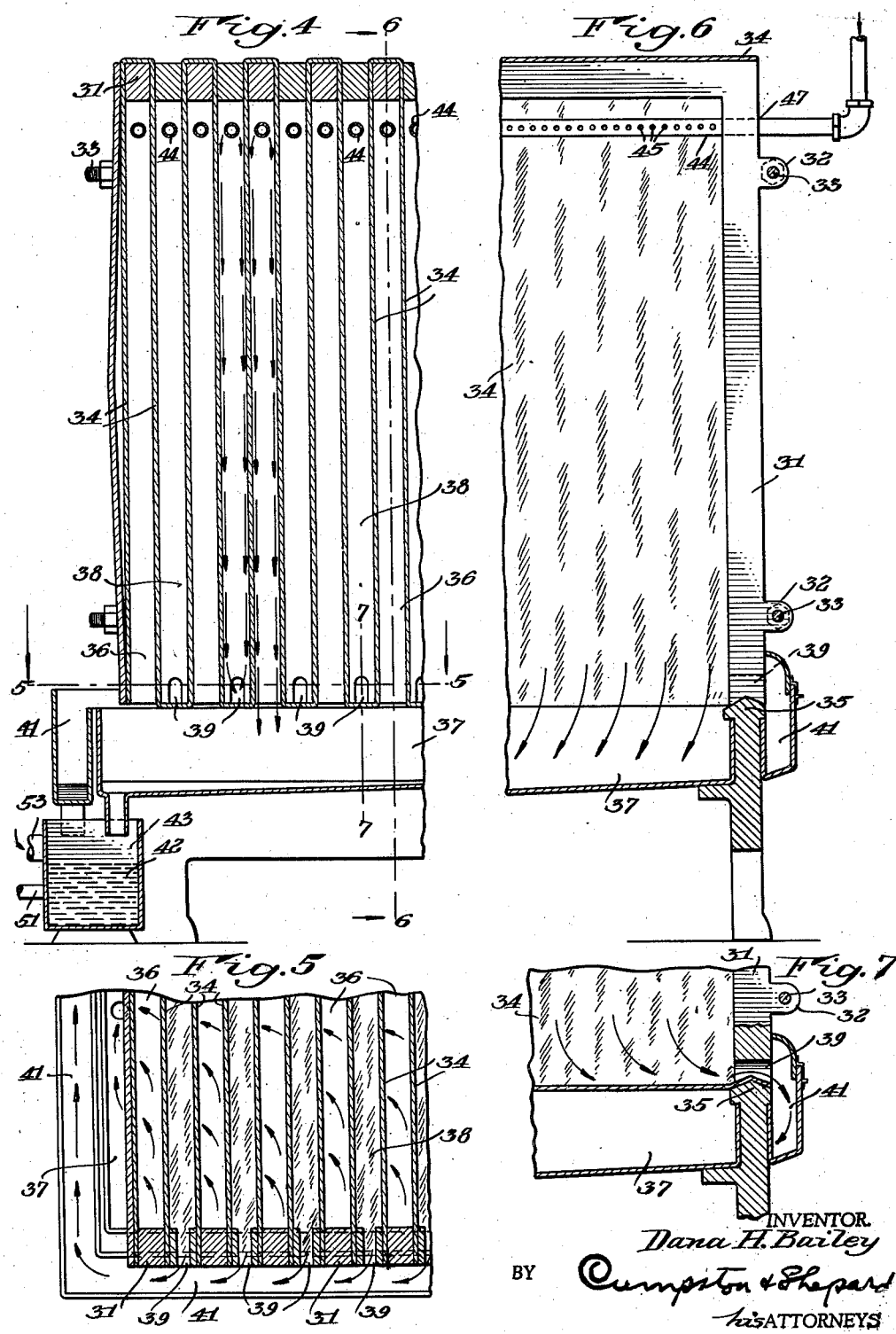

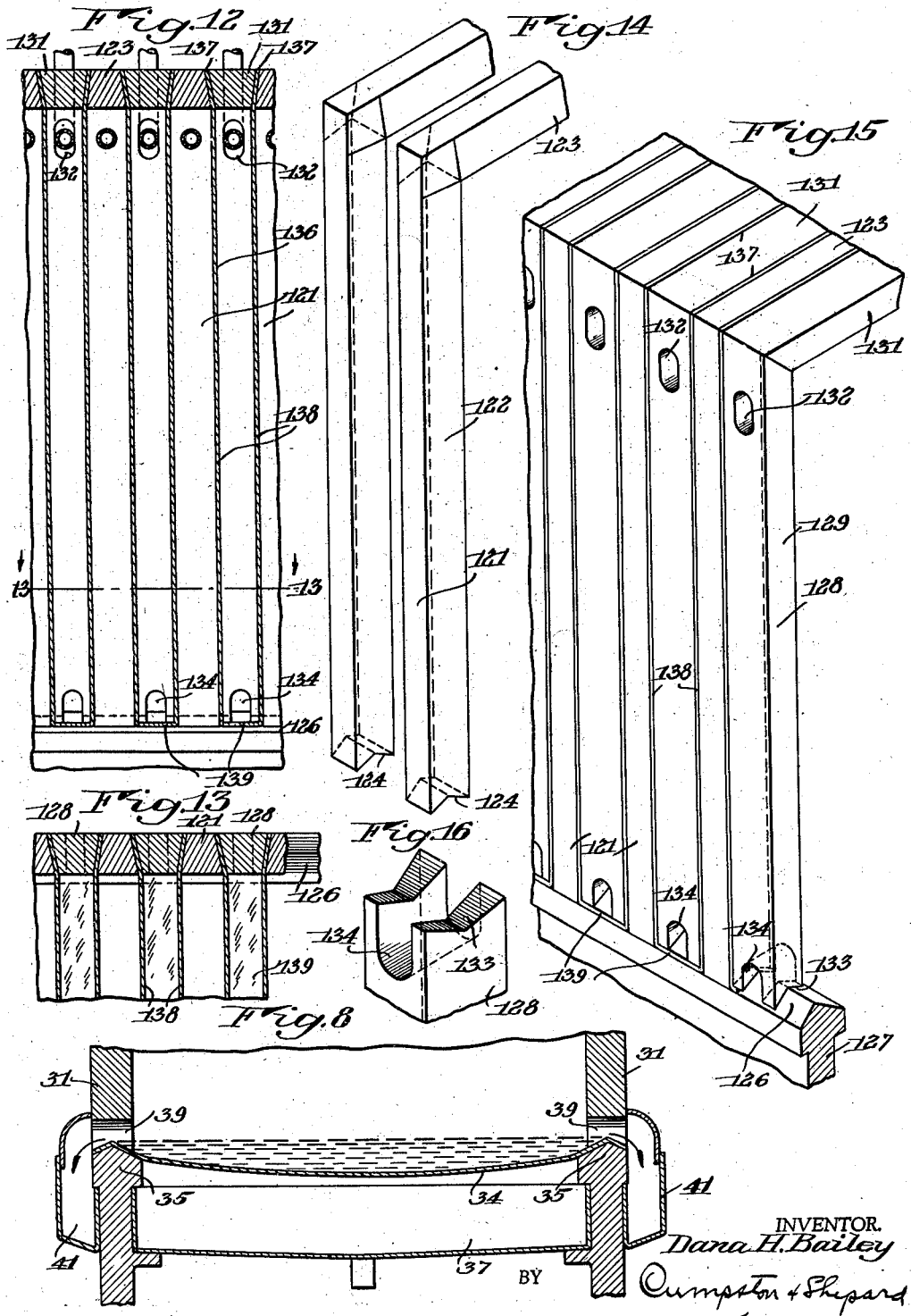

2,247,143

UNITED STATES PATENT OFFICE 2,247,143

DIALYSIS METHOD AND APPARATUS

Dana H. Bailey, Prescott, Wis., assignor to The Pfaudler Co., Rochester, N. Y., a corporation of New York Application July 13, 1938, Serial No. 219,036

24 Claims. (Cl. 210—8.5)

My invention relates to a dialysis method and to apparatus for carrying out such method.

While my invention is concerned particularly with the recovery of caustic hydroxides from impure solutions containing hemi-cellulose, oxy-cellulose and other impurities such as result from the so-called "steeping process" or mercerizing of pulp in the rayon industry; or the recovery of waste products resulting in the mercerization of yarns; or the purification and recovery of caustic hydroxides from the so-called "black liquor" from the digesters of pulp mills using the caustic method of cooking; the method and apparatus of my invention is by no means limited to such uses, and in general may be employed wherever the process of dialysis may be advantageously used for the recovery and purification of liquids or the concentration of solutions.

For example, the method and apparatus of my invention may also be used to separate impurities, such as salts, out of a colloid, such as glue, or, in some cases, may be used to separate two crystalloids where the diffusion characteristics of one crystalloid are appreciably slower than those of the other.

In the dialyzers of the prior art it has been customary to employ a plurality of cells or chambers, the adjacent walls of which are composed partly or wholly of specially prepared canvas or other material to act as dialyzing membranes. The membranes are nearly or usually wholly submerged between alternate layers of solution and solvent, the thickness of the layers of the liquids or their extent in a direction perpendicular to the plane of the membranes being usually about two or three inches. The liquids are usually pumped from one chamber to another in series, and due to the resistance to liquid flow created in the dialyzing unit the movement of the liquids in the chambers is relatively sluggish. Moreover, the pump pressure which may be employed is relatively low, as it is necessary to keep the pressure on the membranes within reasonable limits to avoid membrane breakage. While the rate of flow of the liquid through the cells is slow, this sluggishness is accentuated at the interface of the membranes due to the resistance to flow offered by the membranes.

When any two liquids are separated by a membrane the rate of diffusion through the membrane is dependent, among other factors, upon the concentration gradient on opposite sides of the membrane. For example, consider the case of the recovery of caustic hydroxides from impure solutions resulting from the "steeping process" mentioned above. The rate of diffusion of the hydroxides through the membrane from the solution into the solvent, usually water, is dependent upon the concentration of solute hydroxide particles in the solution as compared with the concentration of solute hydroxide particles in the solvent. When the concentration gradient of solute particles on opposite sides of the membrane is the same, the condition is known as one of equilibrium. No further effective diffusion can take place although there may be, to a certain extent, an interchange of solute particles between opposite sides of the membrane.

When, therefore, the rate of flow of the solvent and the solution past the interface of the membrane is sluggish the dialyzation process must necessarily be sluggish, since the film of liquids at the interface of the membrane are substantially the only effective portions of the liquids and these portions rapidly approach a condition of equilibrium. Because only the two liquids at the interface of the membrane, at the most only thin layers or films of liquids on opposite sides of the membrane actively participate in the dialyzation process, the speed at which the process may be carried out is dependent upon the rate of change of the films or layers of the two liquids adjacent the interface of the membrane. As has been shown above, in the dialyzers of the prior art, the rate of flow, through the cells, particularly adjacent the membranes, is extremely sluggish.

Any replacement of the layer of liquid at the membrane interface by liquid further out in the cell stream is dependent upon motion of the solute particles in accordance with the atomic theory or upon such agitation of the liquids as occurs as they pass through the cells or chambers. The second of these factors is ineffective. As already pointed out above, the rate of flow through the cells is relatively slow and the liquids are relatively quiescent. The first is, of course, insufficient to produce any appreciable interchange of the liquids at the interface of the membranes.

I have found that the rate of diffusion may be materially increased by agitating the liquids or creating a turbulence in the liquids on opposite sides of the membrane so that liquids which have been subjected to the dialysis process are carried away from the interface of the membrane and replaced. More specifically, I have found that the layer or film of liquids closely adjacent the face of the membrane, as fast as solute particles are diffused through the membrane, should be swept away and replaced by other liquids, in the case of the solvent by solvent of lower solute concentration, and in the case of the solution by solution of higher solute concentration. I have found that the liquids which have been subjected to diffusion may be swept off the membrane and replaced most efficiently and rapidly, to maintain the concentration gradient of solute particles in the liquids on opposite sides of the membrane substantially at all times at a maximum, by dispersing the liquids over opposite sides of the membrane, preferably in a thin spray. The liquids, in the form of a thin film or layer, are then permitted to flow down the sides of the membrane by gravity. As the liquids flow down the membrane they are subjected to diffusion. The solvent, containing solute particles which have diffused through the membrane, is quickly swept from the face of the membrane by the oncoming solvent continuously directed onto the membrane and having a lower concentration of solute particles. The solution, containing solvent which has diffused through the membrane, is quickly swept from the face of the membrane by the oncoming solution continuously directed onto the membrane and having a higher concentration of solute particles. Thus, substantially at all times, the concentration gradient of solute particles in the liquids on opposite sides of the membrane is maintained in a maximum with the result that diffusion of the solute particles from the solution into the solvent is considerably more rapid than in the conventional dialyzation processes.

An object of my invention is to provide a dialyzing method and apparatus wherein diffusion through the membrane may be accomplished more rapidly than in the dialyzers of the prior art, thus permitting a decrease in size of the dialyzing unit, a decrease in pumping costs, a better and cheaper product, and a general simplification of the dialyzing system.

Another object of my invention is to provide a frame structure for a dialysis apparatus so constructed and arranged that the membranes may be so suspended as to permit stretching and shrinking of the membranes in accordance with temperature and moisture conditions.

Another object of my invention is to provide a dialyzing unit, the dialyzing membranes of which are subjected to a minimum of pressure to thereby lessen the likelihood of membrane breakage and permit the use of a thinner membrane enabling more rapid diffusion.

Another object of my invention is the provision of a dialyzing apparatus in which the liquids (or either one of them separately) and the dialyzing membrane are moved with respect to each other in a relatively rapid manner, the relative movement being accomplished and the dialyzation process being carried out without exerting any appreciable pressures on the membrane, other than the normal osmotic pressures developed in the dialysis process.

Still another object of my invention is the provision of a dialyzing apparatus and method of dialysis wherein the solvent and the solution are maintained on opposite sides of the membrane in thin films or layers by the cohesion between the liquids and the membrane to thereby insure the active participation of all of both liquids in the dialysis process.

A further object of my invention is the provision of a dialyzing apparatus and method of dialysis in which the solvent and the solution on opposite sides of the membrane, after being subjected to dialysis, are quickly swept off the membrane and replaced, in the case of the solvent, by solvent of lower solute concentration, and in the case of the solution by solution of higher solute concentration, to thereby maintain the concentration gradient of solute particles on opposite sides of the membrane substantially at a maximum at all times.

More specifically it is an object of my invention to provide a dialyzing unit and method of dialysis in which the solution and the solvent are directed onto opposite sides of the membrane in a manner such that they flow by gravity down the sides of the membrane in a thin film or layer whereby substantially all the liquid flowing through the dialyzing unit actively participates in the dialyzing process; the solvent, containing solute particles diffused through the membrane, is quickly swept from the membrane and replaced by solvent of lower solute concentration; and the solution, diluted by solvent diffused through the membrane, is quickly swept off the membrane and replaced by solution of higher solute concentration, to thereby maintain the concentration gradient of solute particles in the liquids on opposite sides of the membrane substantially at a maximum at all times.

To these and other ends the invention resides in certain improvements and combinations of parts, all as will be hereinafter more fully described, the novel features being pointed out in the claims at the end of the specification.

In the drawings:

Fig. 1 is a front elevation of a single unit of my novel dialyzing apparatus;

Fig. 2 is an end elevation of the dialyzing unit;

Fig. 3 is a top plan view of the dialyzing unit;

Fig. 4 is a sectional view taken substantially on the line 4—4 of Fig. 3;

Fig. 5 is a sectional view taken substantially on the line 5—5 of Fig. 4;

Fig. 6 is a view taken substantially on the line 6—6 of Fig. 4;

Fig. 7 is a view taken on the line 7—7 of Fig. 4;

Fig. 8 is a view showing the membrane in the somewhat bellied condition it may assume when the dialyzer is in operation;

Fig. 9 is a view showing one of the membrane carrying frames of the dialyzing unit;

Fig. 10 is a view showing an apparatus enabling adjustment of the pressure on the sprays;

Fig. 11 is a view showing a plurality of dialyzing units mounted in series;

Fig. 12 is a fragmentary view showing a different way of making the dialyzer frames and supporting the membranes;

Fig. 13 is a view taken on the line 13—13 of Fig. 12;

Fig. 14 is a fragmentary perspective view showing two of the stationary frames in position;

Fig. 15 is a fragmentary perspective view showing the movable portions of the frames in position on the stationary portions;

Fig. 16 is a perspective view showing the bottom of one of the removable parts of the frames;

Fig. 17 is a view similar to Fig. 4 showing a slightly different way of mounting the membranes and a somewhat different form of collecting trough;

Fig. 18 is a view taken on the line 18—18 of Fig. 17;

Fig. 19 is a view taken on the line 19—19 of Fig. 17;

Fig. 20 is a view showing one of the spacers for the membranes and illustrating a method by which the sprays may be mounted in and cast integrally with the membrane spacers;

Fig. 21 is a sectional view taken on the line 21—21 of Fig. 20;

Fig. 22 is a bottom view of Fig. 20;

Fig. 23 is a view showing a modified form of my dialyzing apparatus.

The same reference numerals throughout the several views indicate the same parts.

Throughout the specification and claims I will use the terms "solvent," "solution" and "solute" in the following manner: The term "solvent" to denote the liquid, usually water, into which particles as, for example, caustic hydroxides are diffused through the membrane from the impure caustic soda solution to enable recovery of the hydroxides, or the liquid into which the impurities are diffused where a liquid is deleted of impurities as, for example, when salts or other impurities are to be removed from a colloid, such as glue; the term "solution" to denote the liquid containing impurities and the substance to be recovered or deleted of impurities, whether the desired substance is diffused through the membrane and recovered in the solvent or whether the impurities are diffused through the membrane into the solvent and the desired substance left behind; and the term "solute" to denote the particles which pass through the membrane from the solution into the solvent and which particles may be either the material to be recovered, as in the recovery of caustic hydroxides, or the impurities, as in the separation of salts from glue.

The dialyzing unit of my invention (Figs. 1, 2, and 3) in which my novel method of dialysis is carried out comprises a plurality of U-shaped frames 31, the shape of each of which is shown in Fig. 9. The frames are formed with eyes 32 to receive tie-rods 33 by which the frames 31 may be assembled and clamped together with the open portions of the U's extending downward. Prior to assembly there is interwoven around and between the frames a membrane 34 which may be continuous (Fig. 4) or in the form of separate U-shaped strips (Fig. 17). The membrane may be made of any suitable material such as specially prepared canvas, as is well known in the art.

As shown in Fig. 4 there is thus formed a plurality of cells which are closed at the sides by the membrane and at the top by the frames. At the bottom each alternate cell as, for example, cells 36, is open so as to discharge liquid flowing through these cells directly into a tank 37 located below the dialyzer unit. The intermediate cells 38 are closed at the bottom by the membrane 34. Alternate frames, those forming the cells 38, at their lower ends are provided with slots or openings 39 so as to discharge liquid flowing down through these cells sidewardly from the dialyzing unit. Liquid from the cells 38 discharging through the openings 39 flows into a U-shaped trough 41 extending on three sides of the unit. As shown more clearly in Fig. 1, the tank 37 discharges its contents into a sump 42 while the trough 41 discharges its contents into a sump 43. While either set of cells may be the solution cells, I prefer that the solution shall pass downward through the closed cells 38 and the solvent through the open cells 36. The solution is, therefore, collected in the sump 43 and the solvent in the sump 42. The lower ends of the frames are V-shaped (Fig. 6) so as to fit on the V-shaped upper edges of sills 35 (Fig. 6) so that when the membranes of the closed cells belly downward, as shown in Fig. 8, leakage of fluid will be prevented.

In the dialyzer of my invention instead of flooding the cells with solvent and solution, as in the conventional type of dialyzer, the liquids are sprayed onto the membranes through spray pipes 44. The apertures 45 in the spray pipes are relatively small and extend across the width of the membranes between the side arms of the frames so that the liquids are sprayed on the faces of the membranes uniformly across the faces thereof in a fine spray. As indicated by the arrows (Fig. 4) each spray pipe has two sets of apertures 45 (except the spray pipes of the end cells) so that the liquids are directed onto the membrane faces on both sides of each cell. The pipes carrying the liquids enter preferably from opposite sides of the unit (Fig. 3) and extend through apertures 47 formed in the side arms of the frames, the solution from the left hand side and the solvent from the right hand side. The solution, by means of a pump 48, taking its suction from the sump 43 and driven by a motor 49, is pumped through a pipe 51 to a solution spray header 52. An overflow pipe 53, extending from the header 52 back to the sump 43, is provided so that the head of liquid on the sprays remains constant and is determined by the difference in level between the spray pipe apertures and the liquid level in the inlet of the overflow pipe 53. A similar arrangement is provided for the solvent wherein a pump 54, driven by the motor 49, draws solvent from the sump 42 discharging it upward through the pipe 56 to solvent spray tube header 57. An overflow pipe 58 serves to maintain the pressure on the solvent spray tubes constant.

If desired a header may be employed of a type such that the head of liquid on the spray pipes may be varied (Fig. 10). In this construction the header 52 is provided with an upwardly extending leg 50 and a flexible overflow tube 55 the height of which may be adjusted and which discharges into the overflow pipe 53. By raising the flexible tube 55 the level of liquid in the upwardly extending leg 50 is raised so as to increase the head of liquid on the spray apertures 45.

In operation, when solvent and solution are sprayed onto opposite sides of each of the membranes, as indicated by the arrows in Fig. 4, the solvent and solution are directed onto opposite sides of the membrane faces at but a slight pressure. The liquids flow down the faces of the membranes in a thin film or layer, the liquids tending to be held closely adjacent the membranes, as they flow downward by gravity, due to the cohesive forces between the liquids and the membrane. A concentration gradient of solute particles exists between the solution and the solvent and as the liquids flow down the membranes, diffusion of solute particles takes place through the membranes into the solvent in accordance with well known osmotic laws.

As previously mentioned, only a thin film of liquid on each face of the membrane actively participates in the dialysis process and in the flooded type of cell, the concentration gradient of solute particles at the interface of the membrane rapidly decreases and may even reach zero so that equilibrium is established. No resultant diffusion of solute particles into the solvent, under a condition of equilibrium, may take place. The restoration of a concentration gradient or the maintenance of such a gradient in a flooded type cell is dependent upon the sluggish flow of liquids through the cells, the slight agitation of the liquids which occurs by reason of this sluggish flow and the activity of the liquids in accordance with ionic theories. These factors are insufficient to prevent a condition approaching equilibrium at the interface as the solute particles near the center of the stream have to travel through an appreciable thickness of liquid to reach the face of the membrane, and even those solute particles closely adjacent the interface film reach the face only by chance. The positive and rapid interchange of liquid closely adjacent the membrane face with liquid nearer the center of the cell stream is lacking in the conventional flooded cell dialyzer and, primarily for this reason, the process is inefficient and sluggish.

In the dialyzer of my invention, as the solvent and solution flow down the membrane on opposite sides thereof in a thin film or layer, substantially the entire layer of liquid actively participates in the dialysis process. The concentration gradient is substantially continuously maintained at a maximum due to the fact that liquid which has been subjected to dialysis is swept off the membrane and replaced. As fast as diffusion of solvent through the membrane into the solution takes place, the solution diluted by solvent, by the continuous stream of solution flowing down the membrane, is swept off the membrane and replaced by the oncoming solution of higher concentration. Similarly, the solvent flowing down the face of the membrane into which solute particles from the solution have diffused, is quickly swept off the membrane into the tank 37 by the continuous stream of film flowing down the face of the membrane, and is replaced by the oncoming solvent of lower solute concentration. The concentration gradient is thus maintained substantially at all times at a maximum.

The dialyzer unit thus far described is particularly suited to the separation of salts or other impurities from colloids by batch operation where the colloid is the material to be recovered. In this process a batch of solution to be purified is introduced into the sump 43 and repeatedly passed through the dialyzer while solvent, usually water, is continuously fed to the system and discharged outside the system. Thus the concentration gradient is maintained at a maximum level as solvent containing impurities is continuously withdrawn from the system and replaced by pure water. Even where the concentration of solute particles in the solution is very low, a concentration gradient is maintained and diffusion of solute particles may take place through the membrane. It will be particularly noted that the liquids flow through the cells in parallel as distinguished from the usual flooded type of dialyzer where the cells operate in series.

One of the distinct advantages of the dialyzer and method of dialysis of my invention is that the membranes are not subjected to pump pressure. In the conventional type of dialyzer, a pump is used to pump the water through the cells in series, requiring an appreciable pressure, since the resistance to flow offered by the cells is considerable. The existence of this pressure necessitates a relatively thick, strong membrane. In addition, in the conventional type of flooded cell dialyzer, the membranes are subjected to heavy osmotic pressures. Moreover, in most dialyzing processes the endosmose is prevalent. The cells containing the solution, therefore, tend to acquire an additional volume of liquid so that the membranes tend to belly out toward the solvent cells. In my dialyzer, the membranes are not subjected to pump pressure nor to the heavy osmotic pressures mentioned above. Because the membranes are not subjected to any appreciable pressure, the membranes not only may be thinner to enable more rapid diffusion through the membrane, but also are less subject to breakage.

In Figs. 1 and 2, I have indicated a pair of heat exchangers 66 and 67, as I have found that by maintaining a temperature gradient between the solution and the solvent the normal resultant endosmose can be retarded or reversed to a resultant exosmose. This is accomplished by heating the solution as it passes through the pipe 51 by means of the heat exchanger 66, or by cooling the solvent by means of the heat exchanger 67, or if desired, the solution may be heated and the solvent cooled simultaneously. The effect of heating the solution is probably to increase the activity of the solution in accordance with ionic theories to thereby increase the osmotic pressure of the solution and cause the solute particles to diffuse more rapidly through the membrane. The effect of cooling the solvent is probably to decrease the activity of the solvent and hence its osmotic pressure and the rate of diffusion through the membrane. By judicious use of a temperature gradient between the solution and the solvent, the normal endosmose may be materially lessened, or if desired, a resultant exosmose may be obtained. It is further possible, in the case of certain dialyzing processes, that it may be desirable to maintain the solvent at a higher temperature than the solution to thereby increase the normal resultant endosmose and decrease exosmose.

I have found in working with 10% sugar solutions that it was desirable, to prevent a resultant endosmose, to use a logarithmic mean average temperature difference between the solution and the solvent of 8° to 15° F. or an ingoing temperature difference between the sugar solution and the solvent in the neighborhood of 40° F. The temperature difference to be used, to prevent a resultant endosmose, will, of course, vary with the difference in osmotic pressures of the particular solution and solvent used.

In Fig. 11, I have shown a plurality of dialyzer units, substantially the same as that described above, arranged in series. The solvent enters through a pipe 68 and flows to a header 69, then through the dialyzer cells of the dialyzer 70 in parallel to the sump 71. The overflow from the header 69 is discharged through the pipe 72 to the sump 71. From the sump 71 the solvent is pumped by the pump 73 through line 74 to header 76. It then flows through dialyzing unit 77 to a sump 78. The overflow from the header 76 is returned by pipe 79 to the sump 71. From the sump 78, by means of the pump 81, the solvent is caused to flow through the line 82 to the header 83 and thence by gravity through the dialyzing unit 84 to the sump 86. From the sump 86 the solvent containing solute particles, is forced by means of a pump 87 to the point desired. The overflow from the header 83 is returned to the sump 78 by means of a pipe 88.

The solution enters the system through pipe 89 to header 91. From the header the solution flows by gravity through the dialyzing unit 84 to a sump 92. Overflow from the header 91 flows through a line 93 to the sump 92. From the sump 92 by a pump 94 the solution is pumped to a header 96 through a pipe 97. From the header 96 the solution flows by gravity through the dialyzing unit 77 to a sump 98. The overflow from the header 96 is returned to the sump 92 by a line 99. From the sump 98 the solution is pumped by a pump 101 to a header 102 through a line 103. The solution flows by gravity through the dialyzing unit 70 into a sump 104 from whence it is pumped by means of pump 106 to the point desired through a line 107. Overflow from the header 102 is returned by a line 105 to sump 98.

It will be particularly noted that the solution flows through the dialyzer units in series in a direction opposite to that of the movement of the solvent. The purpose of counter flowing the solution and solvent is so that the solution of lowest concentration of solute particles will be subjected to dialysis with the solvent of lowest concentration of solute particles, and conversely the solution of highest concentration of solute particles will be subjected to dialysis with the solvent of highest concentration of solute particles. If the solution and the solvent moved through the dialyzer units in the same direction, then, at the last dialyzer unit, the concentration gradient of solute particles in the solution would be substantially the same as the concentration of the solute particles in the solvent, and no resultant diffusion would take place. For example, a solution containing 16% caustic hydroxides would at the last dialyzer unit still contain approximately 8% caustic hydroxides.

I have also provided, as shown in Fig. 11, a means whereby a portion of the solvent from each dialyzer unit may be recirculated back through the same dialyzer unit from which it has come. Such means comprises adjustable valves 108 and one-way valves 109. By adjusting the valve 109 a desired proportion of solvent may pass through the pipe 110 back to the pipe 68 and then through the dialyzer unit 70. In a similar manner a portion of the solvent from the sump 78 may be circulated back through the dialyzer unit 77. Similarly, the solution piping is provided with adjustable valves 111 and one-way valves 112, so that by adjusting the valves 111 the desired proportion of the solution may be recirculated through the dialyzer 84 or 77.

While in Fig. 11, in an effort to simplify the drawing, I have not shown heat exchangers, it will be apparent that I contemplate the use of heat exchangers as described above. The heat exchangers are preferably placed in lines 68, 89, 74, 103, 82, and 97. While I have shown only three dialyzer units in series, it is evident that more or less units may be used.

One of the distinct advantages of the dialyzer of my invention is that by maintaining a temperature gradient between the solution and the solvent the volume of water required is materially lessened, as if resultant endosmose is prevented no solvent passes into the solution. I am able to use equal parts of solution and solvent, whereas in the usual dialyzing apparatus about twice as much solvent as solution is used. This is particularly important in the purification of colloids as, where resultant endosmose is not prevented or at least minimized, the colloid is materially diluted.

In the construction of the dialyzer unit thus far described, in case of membrane breakage, after locating the leak, the frames adjacent the leak can be cut out by disconnecting their spray tubes from the header. The existence of a leak can be determined by the discoloration of the liquids. The solution may be observed by lifting the cover of the trough 41 while the solvent in the tank 37 may be observed through the window 128. The frames are then unclamped and the unaffected frames loosened from the frame to be cut out. The membrane is then slit at the frame top on both sides of the leak and the frame and cut-out membrane lifted out of the dialyzer unit. The torn portion of the membrane may then be replaced with new, the frames clamped together again, and the piping connected with the headers. Membrane replacement can be easily effected without a major shut down.

In the construction shown in Figs. 12 to 16, inclusive, a modified form of the frame structure thus far described is shown. The frame structure is made and the membranes are carried so that membrane replacement in case of breakage is facilitated. The dialyzer frame of this modification comprises a plurality of fixed frames 121 (Fig. 14) which are held in spaced relation in any suitable manner. The fixed frames each comprises a pair of vertically extending side arms 122 only one of which is shown, and a horizontally extending top member 123. Each of the side arms 122 is wedge-shaped in horizontal cross section with the narrow portion of the wedge facing outward. The lower ends of the side arms are V-shaped, as shown at 124, to be received on a V-shaped portion 126 of a supporting sill 127. The top members 123 of the fixed frames are wedge-shaped in vertical cross section with the taper of the wedge facing upward. The side arms and the top member of each of the fixed frames are preferably formed integral and may be either of wood or metal.

Interposed between each pair of the fixed frames 121 is a removable frame 128 (Fig. 15). The removable frames each comprises a pair of side arms 129 only one of which is shown, and a top member 131. The side arms 129 and the top member 131 are formed separately from each other so that they may be separately removed from the dialyzing unit. The side arms 129 are wedge-shaped in horizontal cross section, with the taper of the wedge facing inward to form complementary surfaces with the wedge surfaces of the fixed side arms 122. Adjacent the top of each of the removable side arms 129 is an aperture 132 which is elongated in a vertical direction and which is adapted to receive a spray pipe for the solution. The lower ends of the removable side arms 129 are V-shaped, as shown at 133 (Fig. 16) to be received on the V-shaped top of the sill 127. The lower ends of the removable side arms 129 are also formed with apertures or slots 134 through which the solution when it reaches the bottom of the membrane is discharged. The top members 131 of the removable frames 128 are wedge-shaped in vertical cross section with the taper of the wedge extending downward to form complementary surfaces with the wedge-shaped portions of the top members 123 of the fixed frames. There is thus formed a substantially solid frame structure for the dialyzer with alternate fixed and removable frames.

The membranes 136 are U-shaped in cross section and have ends 137, side walls 138, and closed bottoms 139. The membranes are positioned in the dialyzing unit by placing their ends 137 adjacent the tapered walls of the top members 123 of the fixed frames 121 and interposing the wedge-shaped top members of the removable frames 128, as shown in Fig. 12. Each U-shaped membrane 136 is thus suspended to hang vertically to form a series of alternate open and closed cells. The removable side arms 129 are placed in position by wedging them in position between the fixed side arms. The side edges of the membrane are preferably wedged between and confined by the wedge surfaces formed on the fixed and removable side arms.

In the event of membrane breakage after the leak has been located, the removable frame carrying the broken membrane is removed. The removable side arm 129 of the frame to be removed is moved upward, the elongated slot 132 permitting upward movement of the side arm with respect to the pipe until the V-shaped bottom of the side arm clears the V-shaped top of the sill, after which the side arm may be moved sidewardly away from the dialyzing unit to be suspended by the spray pipe on the upper margin of the slot 132. After the removable side arms on both sides of the dialyzing unit have been displaced, the top member 131 may be pulled upward to release the membrane. The torn membrane is then quickly removed, a new one inserted in position, and the removable top member 121 placed in position for retaining the membrane in suspended condition. The removable side arms may then be replaced. The entire operation may be accomplished without disturbing any piping, and in fact by cutting off the supply of solution to the affected cell replacement of a broken membrane may be accomplished without a shut-down.

In Figs. 17 to 19, inclusive, I have shown another way in which the dialyzing membranes may be mounted. In this construction the membranes 141 are U-shaped as in the modification just described, and held in fixed position by means of U-shaped frames 142 similar to the frames shown in Fig. 9. Tie rods, similar to those shown in Fig. 2, may be used to clamp the frames together. There is thus formed a series of alternate open and closed cells in which the membranes are separate from each other. When the tie-rods are unloosened to permit separation of the frames, removal of a broken membrane and replacement by a new membrane may be quickly effected. In this construction at the lower end of the unit there is provided a tank 143 having a discharge pipe 144. The solvent flows by gravity down the sides of the membranes in a thin film or layer, falls into the trough 143 and is carried away by the pipe 144. The lower ends of the solution cells are closed and adjacent the bottom of each of the solution cells there is provided a trough-like pipe 146 into which the solution flows. The solution is carried away by a common discharge pipe 147, into which all of the troughs empty. The advantage of using trough-like pipes in the solution cells is to avoid the pronounced bellying of the membrane, such as is likely to occur as suggested in Fig. 8.

In Figs. 20 to 22, inclusive, I have shown a way in which the solution and the solvent sprays may be formed integral with the frames. The frames (Fig. 21) are hollow to provide a fluid passage 151 having spray openings 152. As shown more clearly in Fig. 22 the bottom surface of the top portions of the frame members are provided with two rows of spray openings 152 so that the liquid is sprayed onto the opposite sides of the membrane.

In Fig. 23 I have shown a modification of my invention wherein the membranes 152 extend at an angle to the vertical and are supported at the sides by spacers or frame members 154. In this construction the fluid passages and spray nozzles may be formed integrally with the frame members, as shown at 156. In this form of the invention, the center of the dialyzing membranes is the low point, and the solution and solvent flow on opposite sides of the membranes from the frames downwardly along the membranes toward the center. At the center troughs are provided for the separate collection of the solution and the solvent. The solvent troughs are indicated by the numeral 157 and the solution troughs by the numeral 156. As shown by the arrows the solution or solvent will flow along the upper sides of the membranes by gravity and into the troughs. The solution or solvent will flow along the under sides of the membranes by gravity and be held against the membranes by the cohesion between the membranes and the solution or solvent. When the solution or solvent reaches the centers or low points of the membranes, it will drop into one of the troughs 156 or 157. As the solution and solvent flow down the opposite sides of the membrane, diffusion takes place in the manner described above. It will be understood that heat exchangers may be used in the supply pipes of this form of dialyzer to maintain a temperature gradient between the solution and the solvent.

While I have shown and described various forms of dialyzer apparatus and have described the preferred method of carrying out the dialyzing process of my invention, it is apparent that various other arrangements and constructions will readily suggest themselves to those skilled in the art, within the scope of my invention as set forth in the appended claims.

I claim:

1. A dialyzing apparatus comprising, in combination, a multiplicity of frames supported substantially vertically, membranes carried by said frames, spray means for distributing a substantially continuous, even film of solvent on one side of each of the membranes, spray means for distributing a substantially continuous, even film of solution on the other side of each of the membranes, means for maintaining the spray pressures of the liquids on opposite sides of the membranes substantially the same, and means adjacent the bottoms of the membranes for separately discharging the solution and solvent, said last mentioned means being of such discharge capacity that the spaces between the membranes will not be flooded.

2. A dialyzing apparatus comprising, in combination, a multiplicity of frames supported substantially vertically, membranes carried by said frames, means for distributing a substantially continuous thin film of solvent on one side of each of the membranes, means for distributing a substantially continuous thin film of solution on the other side of each of the membranes, means for maintaining one of said liquids at a higher temperature than the other, and means adjacent the bottoms of the membranes for separately discharging the solution and solvent, said last mentioned means being of such discharge capacity that the spaces between the membranes will not be flooded.

3. A dialyzing apparatus comprising the combination of a plurality of frames, membranes for separating the solvent from the solution carried by said frames at an inclination to the horizontal, said plurality of frames constituting a dialyzing unit, a plurality of such dialyzing units, means for passing the solvent through each of said units in parallel and through the plurality of units in series in one direction, and means for passing the solution through each of said units in parallel and through the plurality of units in series in a counter-current direction to the solvent flow, each of said means comprising outlets for distributing said liquids onto upper portions of opposite sides of each of said membranes, respectively, in volumes adapted to produce films flowing downwardly thereover by gravity and in a thickness produced by the cohesive forces between said liquids and membranes.

4. A dialyzing apparatus comprising, in combination, a multiplicity of frames supported substantially vertically, membranes carried by said frames, means including a spray for distributing a substantially continuous, even film of solvent on one side of each of said membranes, means for distributing a substantially continuous, even film of solution on the other side of each of said membranes, means for varying the spray pressures of the liquids on opposite sides of the membranes, and means for separately collecting the solvent and the solution.

5. A dialyzing apparatus comprising, in combination, a plurality of membranes, means for supporting said membranes in spaced relationship, said membranes being inclined to the vertical and all being substantially parallel to each other, means for directing a stream of solvent onto one side of each of the membranes, means for directing a solution to the other side of each of said membranes, and means for collecting the solvent and solution separately at least as fast as they are directed onto said membrane sides to prevent flooding thereof.

6. A dialyzing apparatus comprising, in combination, a multiplicity of U-shaped frames, each of the frames being supported vertically, membranes carried by said frames, said membranes separating a solution from a solvent, a V-shaped sill engaging the lower ends of the frames, the frames having ends cooperating with said sill and clamping the membranes therebetween to prevent leakage.

7. A dialyzing apparatus comprising a plurality of alternate fixed and removable frames, said fixed frames having wedge-shaped top members and said removable frames having complementary separately removable wedge-shaped top members and separately removable side members, membranes carried by the wedge-shaped portions of said top members in a suspended condition, said removable top members and side members being constructed and arranged, upon removal, to free the adjacent membrane individually for removal and replacement.

8. A dialyzing apparatus including, in combination, a multiplicity of frames, membranes carried by said frames and dividing said apparatus into a series of chambers, said membranes having a substantial surface on each extending substantially unobstructedly at an inclination to the horizontal, means including sprays in certain of said chambers adjacent the tops of said membranes for directing a substantially continuous stream of liquid solvent onto said surface of each of said membranes so that it flows down the surface of said membrane in a thin, sheet-like film, said film being held on said membrane primarily by the cohesive forces between said membrane and said solvent, means for directing a solution onto the other side of each of said membranes, and means adjacent the bottoms of said membranes for separately collecting and discharging said solvent at least as fast as it is supplied by said spray means so that said surfaces of said membranes remain substantially unflooded.

9. A dialyzing apparatus including, in combination, a multiplicity of frames, membranes carried by said frames and dividing said apparatus into a series of chambers, said membranes having a substantial surface on each extending substantially unobstructedly at an inclination to the horizontal, means including sprays in certain of said chambers adjacent the tops of said membranes for directing a substantially continuous stream of liquid solution onto said surface of each of said membranes so that it flows down the surface of said membrane in a thin, sheet-like film, said film being held on said membrane primarily by the cohesive forces between said membrane and said solution, means for directing a solvent onto the other side of each of said membranes, and means adjacent the bottoms of said membranes for separately collecting and discharging said solvent at least as fast as it is supplied by said spray means so that said sprayed surfaces of said membranes remain substantially unflooded.

10. A dialyzing apparatus comprising, in combination, a multiplicity of U-shaped frames, each of the frames being supported vertically with the open portions extending downward, U-shaped membranes carried by said frames with the open portions of said membranes extending upward, said membranes separating a solution from a solvent, and a V-shaped sill engaging the lower ends of the frames, the frames having ends shaped to cooperate with said sill and clamping the membranes therebetween to prevent leakage.

11. In a dialyzing apparatus, in combination, a plurality of dialyzing units each comprising a plurality of inclined frames, membranes carried by said frames for separating a solvent from a solution, said membranes dividing the unit into a series of chambers, means for directing the solvent and the solution onto the opposite sides of each of the membranes of each unit so that the liquids flow by gravity over the faces of the membranes, said chambers having outlets for discharging said liquids at least as fast as they are supplied thereto so that the chambers are unflooded, and means for circulating said liquids separately through the series of units in directions countercurrent to each other.

12. In a dialyzing apparatus in combination a plurality of frames, membranes carried by said frames for separating a solvent from a solution, said plurality of frames constituting a dialyzing unit and the membranes dividing the unit into a series of chambers, a plurality of such dialyzing units, means located adjacent the tops of each of the membranes for supplying a solution and a solvent onto opposite sides of each of the membranes, means located adjacent the bottom of each of said units for separately collecting the solution and the solvent, said collecting means cooperating to maintain the chambers in an unflooded condition so that the liquids flow down the membranes by gravity and in thin liquid strata, means for separately conveying the liquids from the bottom of one unit to the top of another, said last mentioned means being arranged so that the liquids flow through the plurality of units in directions counter-current to each other.

13. A method of dialysis adapted for continuous operation which includes the steps of separating a solvent from a solution by a stationary membrane inclined to the horizontal, continuously supplying solvent to one side of the membrane, continuously supplying solution to the other side of the membrane, distributing the solution over the membrane in a thin liquid stratum on one side of which is the membrane and the other side of which is free and unsupported, distributing the solvent over the other side of the membrane in a thin liquid stratum on one side of which is the membrane and the other side of which is free and unsupported, and separately collecting at least one of said liquids.

14. A method of dialysis adapted for continuous operation which includes the steps of separating a solvent from a solution by a membrane supported in a stationary position at an angle to the horizontal, directing a liquid solution onto one side of the membrane, directing a liquid solvent onto the other side of the membrane, permitting the solution and solvent liquids to flow substantially unrestrictedly down the opposite sides of and in contact with the membrane, entirely by gravity, while the membrane considered as a whole is maintained substantially free of any liquid pressures and unflooded, and separately collecting at least one of said liquids.

15. A method of dialysis which comprises separating a liquid solvent from a liquid solution by a membrane inclined to the horizontal, directing the solution onto the membrane, permitting the solution to flow and fall entirely by gravity over the membrane in a film, directing the solvent onto the opposite side of the membrane, permitting the solvent to flow and fall entirely by gravity over said other side of the membrane in a film, withdrawing said liquids after flowing over said membrane so as to maintain the same unflooded and separately collecting at least one of said liquids.

16. A method of dialysis which includes the steps of circulating a solution and a solvent through a series of dialyzing units each comprising a plurality of membranes inclined to the horizontal, one of said liquids being introduced at the first of said units and progressing to the last of said units and the other of said liquids being introduced at the last of said units and progressing to the first of said units, so that said liquids flow through said units, as a whole, separately and in countercurrent to each other, distributing one of said liquids over the upper portions of one side of each of said membranes, and the other liquid over the upper portion of the other side of each of said membranes, to cause said liquids to flow downwardly thereover by gravity in the same direction in thin films supported only by the cohesive forces between said liquids and said membrane, withdrawing said liquids after flow over each membrane as fast as they are distributed thereover to prevent flooding of said membrane sides and separately collecting at least one of said liquids.

17. A method of dialysis which comprises separating a solvent from a solution by an inclined membrane, discharging said liquids onto upper portions of opposite sides of said membrane, respectively, and causing the same to flow downwardly in a thin film substantially unrestrictedly over the major portion of the surface of the membrane and substantially entirely by gravity, said flow being maintained with both sides of the membrane substantially free of liquid pressures and unflooded, and separately collecting at least one of said liquids after flowing over said membrane.

18. A method of dialysis adapted for continuous operation which includes the steps of separating a liquid solvent from a liquid solution by a membrane supported in a stationary position at an angle to the horizontal, directing one of said liquids onto one side of the membrane and directing the other of said liquids onto the other side of the membrane, causing at least one of said liquids to flow down an unflooded side of the membrane in a thin film substantially entirely by gravity and restricted substantially only by contact with the membrane, while the membrane on both sides thereof is maintained substantially free of liquid pressures, and separately collecting at least one of said liquids after flow over said membrane.

19. A method of dialysis adapted for continuous operation which includes the steps of separating a liquid solvent from a liquid solution by a stationary membrane supported at an angle to the horizontal, continuously supplying solvent to one side of the membrane, continuously supplying solution to the other side of the membrane, directing at least one of the liquids over one side of the membrane in a film and in such volume that most of the liquid flowing over the membrane is held thereon primarily by the cohesive forces between the membrane and the liquid, causing the other of said liquids to flow over the other face of said membrane, drawing off the liquid of said film after flow over said membrane to prevent flooding said membrane side and to maintain continuous replacement of treated liquid by liquid of different concentration by a sweeping action of oncoming liquid over a substantial area of said membrane, and separately collecting at least one of said liquids after flow over said membranes.

20. A method of dialysis wherein a series of dialyzing units are provided, each unit including a plurality of stationary membranes, which includes the steps of circulating a solution and a solvent through the series of dialyzing units on opposite sides of each of the membranes, one of said liquids entering the dialyzing system at the first unit and progressing to the last unit and the other of said liquids entering the dialyzing system at the last unit and progressing to the first unit, the flow of the liquids through the system as a whole being countercurrent to each other, directing said liquids onto opposite sides of each of said membranes, respectively, for flow downwardly thereover by gravity in the same direction in thin films maintained by the cohesive forces between said liquids and membrane, and collecting said liquids as fast as they are discharged from said membranes to maintain the same substantially unflooded.

21. A dialyzing apparatus comprising a plurality of alternately fixed and removable frames, said fixed frames having wedge-shaped top members and said removable frames having complementary, separately removable, wedge-shaped top members and removable side members, membranes carried by said wedge-shaped portions of said top members in suspended position in said apparatus, said removable top members and side members being constructed and arranged, upon removal, to free the adjacent membranes, individually, for removal and replacement.

22. A dialyzing apparatus comprising a dialyzing membrane arranged at an inclination to the horizontal and having on at least one side thereof a substantially unobstructed surface, liquid conducting means having outlet means for distributing one of said liquids over the upper portion of said membrane surface in a volume sufficient to produce a thin film of said liquid flowing by gravity over and supported only by said surface and having substantially the thickness produced by the cohesive forces between said liquid and said membrane, discharge means for withdrawing the liquid of said film as fast as it flows over said membrane surface to prevent flooding thereof, conducting means for supplying the other of said liquids for flow over the opposite side of said membrane, and a conductor for separately collecting at least one of said liquids after flow over said membrane.

23. A dialyzing apparatus comprising a dialyzing membrane arranged at an inclination to the horizontal, liquid conducting means having outlet means for distributing a liquid solution against the upper portion of one side of said membrane in a volume sufficient to produce a thin film flowing by gravity over and supported only by said membrane, said film having substantially the thickness produced by the cohesive forces between said solution and said membrane, conducting means for supplying a liquid solvent to the opposite side of said membrane, and a conductor for collecting one of said liquids after contact with said membrane.

24. A dialyzing apparatus including, in combination, a multiplicity of dialyzing membranes each having the opposite sides thereof extending substantially unobstructedly at an inclination to the horizontal, liquid conducting means provided with discharge openings constructed and arranged for directing a liquid solvent and a liquid solution onto upper portions of said opposite sides of said membranes, respectively, in volumes sufficient to produce a gravity flow over each of said sides of a film supported only by said side, said films having substantially the thickness produced by the cohesive forces between said liquids and said membrane sides, discharge means for withdrawing said liquids as fast as they flow over said membrane sides to prevent flooding thereof and separate conductors for collecting the films discharged from said membranes.

DANA H. BAILEY.

CERTIFICATE OF CORRECTION.

Patent No. 2,247,143.                                                 June 24, 1941.

DANA H. BAILEY.

It is hereby certified that error appears in the printed specification of the above numbered patent requiring correction as follows: Page 1, first column, line 14, for the word "is" read --are--; page 6, second column, line 35, for "apparent" read --contemplated--; page 7, first column, line 22, claim 4, after "means" insert --including a spray--; and second column, line 46, claim 11, after "of" insert --unflooded--; line 49, same claim, after "gravity" insert --downwardly--; lines 52 and 53, same claim 11, for "are unflooded" read --remain unflooded in use--; and that the said Letters Patent should be read with this correction therein that the same may conform to the record of the case in the Patent Office.

Signed and sealed this 12th day of August, A. D. 1941.

(Seal)                                                                            Henry Van Arsdale,
                                                                                  Acting Commissioner of Patents.